United States Patent
Islam et al.

(10) Patent No.: US 11,582,764 B2
(45) Date of Patent: Feb. 14, 2023

(54) OPTIMIZED RADIO RESOURCE MANAGEMENT (RRM) MEASUREMENT RELAXATION

(71) Applicant: QUALCOMM Incorporated, San Diego, CA (US)

(72) Inventors: Muhammad Nazmul Islam, Littleton, MA (US); Linhai He, San Diego, CA (US); Yong Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 17/219,466

(22) Filed: Mar. 31, 2021

(65) Prior Publication Data

US 2021/0314959 A1    Oct. 7, 2021

Related U.S. Application Data

(60) Provisional application No. 63/004,473, filed on Apr. 2, 2020.

(51) Int. Cl.
| | | |
|---|---|---|
| *H04W 72/08* | (2009.01) | |
| *H04W 72/04* | (2009.01) | |
| *H04W 72/12* | (2009.01) | |
| *H04L 5/00* | (2006.01) | |
| *H04W 72/1263* | (2023.01) | |

(52) U.S. Cl.
CPC ......... *H04W 72/082* (2013.01); *H04L 5/0032* (2013.01); *H04W 72/048* (2013.01); *H04W 72/1263* (2013.01)

(58) Field of Classification Search
CPC ............. H04W 72/082; H04W 72/048; H04W 72/1263; H04L 5/0032
See application file for complete search history.

(56) References Cited

U.S. PATENT DOCUMENTS

| | | |
|---|---|---|
| 2017/0150384 A1 | 5/2017 | Rune et al. |
| 2018/0323884 A1 | 11/2018 | Ku et al. |
| 2019/0254110 A1* | 8/2019 | He ..................... H04L 41/0896 |

FOREIGN PATENT DOCUMENTS

| | | |
|---|---|---|
| EP | 3800933 A1 | 4/2021 |
| WO | WO-2021184197 A1 * | 9/2021 |

OTHER PUBLICATIONS

3GPP TSG-RAN WG2 Meeting #109-e R2-200xxxx, Online, Feb. 24-Mar. 6, 2020 (Year: 2020).*

(Continued)

*Primary Examiner* — Jianye Wu
(74) *Attorney, Agent, or Firm* — Loza & Loza, LLP/Qualcomm

(57) ABSTRACT

This disclosure provides systems, methods and apparatus, including computer programs encoded on computer storage media, for a scheduled entity to communicate within a wireless communication network. In one aspect, the scheduled entity receives a plurality of neighbor cell measurement relaxation mechanisms from a scheduling entity. The scheduled entity determines one or more channel condition parameters and selects one or more of the pluralities of neighbor cell measurement relaxation mechanisms, based on the determined one or more channel condition parameters. The scheduled entity executes measurement of one or more neighbor cells using the selected one or more neighbor cell measurement relaxation mechanisms.

30 Claims, 13 Drawing Sheets

(56) References Cited

OTHER PUBLICATIONS

International Search Report and Written Opinion—PCT/US2021/025462—ISA/EPO—dated Jun. 29, 2021.

VIVO: "38 .304 Running CR on UE Power Saving in NR", 3GPP Draft, 3GPP TSG-RAN WG2 Meeting #109 electronic, R2-2002302, 3rd Generation Partnership Project (3GPP), Mobile Competence Centre, 650, Route Des Lucioles, F-06921 Sophia-Antipolis Cedex, France, vol. RAN WG2, No. E-Heeting, Feb. 24, 2020-Mar. 6, 2020, Mar. 11, 2020 (Mar. 11, 2020), XP051864829, 7 Pages, Retrieved from the Internet: URL: https://ftp.3gpp.org/tsg_ran/WG2_RL2/TSGR2_109_e/Docs/R2-2002302.zip. R2-200230238.304 Running CR on UE Power saving in NR.docx [Retrieved on Mar. 11, 2020] 5.2.4.x.15.2.4.X.2.

ZTE Corporation, et al., "Power Saving Approach in RRM" 3GPP Draft, 3GPP TSG-RAN WG2 Meeting #107, R2-1909801, Power Saving Approach in RRM, 3rd Generation Partnership Project (3GPP), Mobile Competence Centre, 650, Route Des Lucioles, F-06921 Sophia-Antipolis Cedex, France, vol. RAN WG2, No. Prague, Czech Republic, Aug. 26, 2019-Aug. 30, 2019, Aug. 15, 2019 (Aug. 15, 2019), XP051767596, 4 Pages, Retrieved from the Internet: URL: http://www.3gpp.org/ftp/tsg_ran/WG2_RL2/TSGR2_107/Docs/R2-1909801.zip. [Retrieved on Aug. 15, 2019] p. 2/4.

* cited by examiner

| DRX Cycle Lengths | Scaling Factor (N1) | | Intra-Detection Time Interval (# DRX Cycles) | Intra-Measurement Time Interval (# DRX Cycles) | Intra-Evaluation Time Interval (# DRX Cycles) |
|---|---|---|---|---|---|
| | FR1 | FR2 | | | |
| 0.32 | 1 | 8 | 11.52 x N1 x M2 (36 x N1 x M2) | 1.28 x N1 x M2 (4 x N1 x M2) | 5.12 x N1 x M2 (16 x N1 x M2) |
| 0.64 | 1 | 5 | 17.92 x N1 (28 x N1) | 1.28 x N1 (2 x N1) | 5.12 x N1 (8 x N1) |
| 1.28 | 1 | 4 | 32 x N1 (25 x N1) | 1.28 x N1 (1 x N1) | 6.4 x N1 (5 x N1) |
| 2.56 | 1 | 3 | 58.88 x N1 (23 x N1) | 2.56 x N1 (1 x N1) | 7.68 x N1 (3 x N1) |

Figure 5

| DRX Cycle Lengths | Scaling Factor (N1) | | Inter-Detection Time Interval (# DRX Cycles) | Inter-Measurement Time Interval (# DRX Cycles) | Inter-Evaluation Time Interval (# DRX Cycles) |
|---|---|---|---|---|---|
| | FR1 | FR2 | | | |
| 0.32 | 1 | 8 | 11.52 x N1 x 1.5 (36 x N1 x 1.5) | 1.28 x N1 x 1.5 (4 x N1 x 1.5) | 5.12 x N1 x 1.5 (16 x N1 x 1.5) |
| 0.64 | 1 | 5 | 17.92 x N1 (28 x N1) | 1.28 x N1 (2 x N1) | 5.12 x N1 (8 x N1) |
| 1.28 | 1 | 4 | 32 x N1 (25 x N1) | 1.28 x N1 (1 x N1) | 6.4 x N1 (5 x N1) |
| 2.56 | 1 | 3 | 58.88 x N1 (23 x N1) | 2.56 x N1 (1 x N1) | 7.68 x N1 (3 x N1) |

| DRX Cycle Lengths | E-UTRAN Detect Time Interval (# DRX Cycles) | E-UTRAN Measure Time Interval (# DRX Cycles) | E-UTRAN Evaluate Time Interval (# DRX Cycles) |
|---|---|---|---|
| 0.32 | 11.52 (36) | 1.28 (4) | 5.12 (16) |
| 0.64 | 17.92 (28) | 1.28 (2) | 5.12 (8) |
| 1.28 | 32(25) | 1.28 (1) | 6.4 (5) |
| 2.56 | 58.88 (23) | 2.56 (1) | 7.68 (3) |

Figure 7

OPTIMIZED RADIO RESOURCE MANAGEMENT (RRM) MEASUREMENT RELAXATION

RELATED APPLICATIONS

This application claims priority to provisional U.S. App. No. 63/004,473, filed on Apr. 2, 2020 to Islam et al, titled "Optimized Radio Resource Management (RRM) Measurement Relaxation," the contents of which is incorporated by reference in its entirety herein.

TECHNICAL FIELD

The technology discussed below relates generally to wireless communication systems, and to configuration of Radio Resource Management (RRM) measurement relaxation in a wireless communication network.

DESCRIPTION OF THE RELATED TECHNOLOGY

Wireless communication networks are widely deployed to provide various communication services such as telephony, video, data, messaging, broadcasts, and so on. Such networks, which are usually multiple access networks, support communications for multiple scheduled entities (such as user equipment (UE)) by sharing the available network resources.

Radio resource management (RRM) technologies and techniques have been developed to ensure that the scheduled entities can maintain robust and reliable connection(s) to one or more base stations. RRM technologies enable mobility management, handover, cell quality measurements, and synchronization. For example, a user equipment (UE) can conduct measurements on neighboring cells signal quality using reference signals transmitted in the neighboring cells. Unlike LTE systems, where base stations continuously transmit cell-specific reference signals (CRS) to enable the UE to measure the cell quality of the neighboring cells, later-generation systems (such as 5G NR) have eliminated always-on reference signals to reduce inter-cell interference and signaling overhead.

In instances where UEs are experiencing low mobility states or experiencing cell edge effects, improvements are needed to allow UEs to operate efficiently within a wireless network.

SUMMARY

The systems, methods and devices of this disclosure each have several innovative aspects, no single one of which is solely responsible for the desirable attributes disclosed herein.

One innovative aspect of the subject matter described in this disclosure can be implemented in an apparatus of a scheduled entity within a wireless network, that includes a first interface, such as a transceiver, configured to obtain a plurality of neighbor cell measurement relaxation mechanisms from a scheduling entity in the wireless network. The apparatus further includes a processing system that is configured to select one or more of the plurality of neighbor cell measurement relaxation mechanisms based on one or more channel condition parameters, and execute measurement of one or more neighbor cells using the selected one or more neighbor cell measurement relaxation mechanisms. The channel condition parameters may include, but are not limited to, reference signal received power (RSRP), reference signal received quality (RSRQ), or signal-to-noise and interference ratio (SINR) metrics. The relaxation mechanisms may include, but are not limited to, inter-frequency, intra-frequency or inter-radio access technology (RAT) mechanisms.

Another innovative aspect of the subject matter described in this disclosure can be implemented in a method for an apparatus of a scheduled entity to communicate within a wireless communication network, including receiving, via a first interface such as a transceiver, a plurality of neighbor cell measurement relaxation mechanisms from a scheduling entity, selecting one or more of the plurality of neighbor cell measurement relaxation mechanisms, based on one or more channel condition parameters, and executing measurement of one or more neighbor cells using the selected one or more neighbor cell measurement relaxation mechanisms. The channel condition parameters may include, but are not limited to, RSRP, RSRQ, or SINR metrics. The relaxation mechanisms may include, but are not limited to, inter-frequency, intra-frequency or inter-RAT mechanisms.

Another innovative aspect of the subject matter described in this disclosure can be implemented in an apparatus of a scheduled entity within a wireless network, including means for obtaining a plurality of neighbor cell measurement relaxation mechanisms from a scheduling entity in the wireless network, and means for processing. The means for processing may be configured to select one or more of the plurality of neighbor cell measurement relaxation mechanisms based on one or more channel condition parameters, and execute measurement of one or more neighbor cells using the selected one or more neighbor cell measurement relaxation mechanisms. The channel condition parameters may include, but are not limited to, RSRP, RSRQ, or SINR metrics. The relaxation mechanisms may include, but are not limited to, inter-frequency, intra-frequency or inter-RAT mechanisms.

Another innovative aspect of the subject matter described in this disclosure can be implemented in a computer-readable medium including program instructions configured to cause a processor system of a scheduled entity to communicate within a wireless network. The storage medium may include instructions for receiving, via a first interface, a plurality of neighbor cell measurement relaxation mechanisms from a scheduling entity, instructions for selecting one or more of the plurality of neighbor cell measurement relaxation mechanisms, based on one or more channel condition parameters, and instructions for executing measurement of one or more neighbor cells using the selected one or more neighbor cell measurement relaxation mechanisms. The channel condition parameters may include, but are not limited to, RSRP, RSRQ, or SINR metrics. The relaxation mechanisms may include, but are not limited to, inter-frequency, intra-frequency or inter-RAT mechanisms.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 5 is a table showing example parameters for measurement of intra-frequency cells for a scheduled entity.

FIG. 6 is a table showing example parameters for measurement of inter-frequency cells for a scheduled entity.

FIG. 7 is a table showing example parameters for measurement of inter-RAT E-UTRAN cells for a scheduled entity.

Like reference numbers and designations in the various drawings indicate like elements.

DETAILED DESCRIPTION

Figure 1:
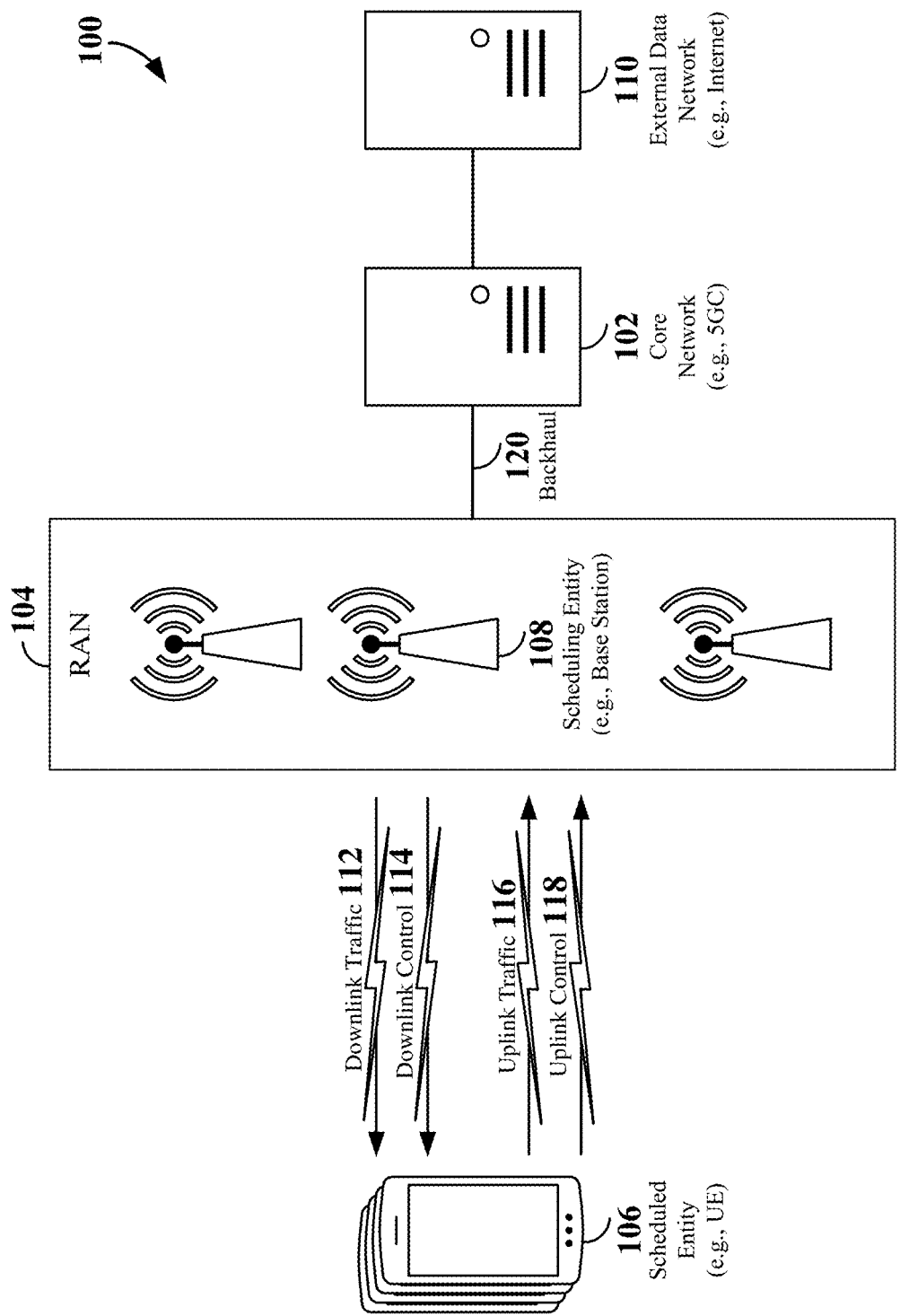
FIG. 1 is a schematic illustration of an example wireless communication system.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (JOT) network, such as a system utilizing 3G, 4G or 5G, or further implementations thereof, technology.

The present disclosure describes various systems, apparatuses and methods for providing cell measurement relaxation technologies to scheduled entities, such as user equipment (UE). The scheduled entities may be configured to receive a plurality of neighbor cell measurement relaxation mechanisms from a scheduling entity (such as base station). The scheduled entity may determine one or more channel condition parameters and may select one or more of the pluralities of neighbor cell measurement relaxation mechanisms, based on the determined one or more channel condition parameters. The scheduled entity may execute measurement of one or more neighbor cells using the selected one or more neighbor cell measurement relaxation mechanisms including, but not limited to, intra-frequency measurements, inter-frequency measurements and intra-radio access technology (RAT) measurements on regular or modified time scales. As discussed in greater detail below, channel condition parameters may include one or more combinations of reference signal received power (RSRP), reference signal received quality (RSRQ) and signal-to-noise and interference ratio (SINR).

Particular implementations of the subject matter described in this disclosure can be implemented to realize one or more of the following potential advantages. By providing pluralities of relaxation mechanisms, scheduled entities may obtain better mobility performance, operate more efficiently within a network, and utilize less power, particularly during idle or inactive states.

FIG. 1 is a schematic illustration of an example wireless communication system 100. The wireless communication system 100 includes three interacting domains: a core network 102, a radio access network (RAN) 104, and a UE 106, which is also referred to herein as a scheduled entity. By virtue of the wireless communication system 100, the UE 106 may be enabled to carry out data communication with an external data network 110, such as (but not limited to) the Internet.

The RAN 104 may implement any suitable radio access technology (RAT) or RATs to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108, also referred to herein as scheduling entity. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but also may be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and a NR base station to receive data packets from both the LTE base station and the NR base station.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, such as corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer or wearable device, such as eyewear, a wearable camera, a virtual reality device, a smart watch, a health or fitness tracker, a digital audio player (such as MP3 player), a camera, a game console, etc. A mobile apparatus may additionally be a digital home or smart home device such as a home audio, video, or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (such as a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, such as in terms of prioritized access for transport of critical service data, or relevant QoS for transport of critical service data.

Wireless communication between a RAN 104 and a UE 106 may be described as utilizing an air interface. Transmissions over the air interface from a base station (such as base station 108) to one or more UEs (such as UE 106) may be referred to as downlink (DL) transmission. In accordance with certain aspects of the present disclosure, the term downlink may refer to a point-to-multipoint transmission originating at a scheduling entity (described further below; such as base station 108). Another way to describe this scheme may be to use the term broadcast channel multiplexing. Transmissions from a UE (such as UE 106) to a base station (such as base station 108) may be referred to as uplink (UL) transmissions. In accordance with further aspects of the present disclosure, the term uplink may refer to a point-to-point transmission originating at a scheduled entity (described further below; such as UE 106).

In some examples, access to the air interface may be scheduled, where a scheduling entity (such as a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (such as one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (such as a grant), synchronization or timing information, or other control information from another entity in the wireless communication network such as the scheduling entity 108.

In addition, the uplink or downlink control information or traffic information may be time-divided into frames, subframes, slots, or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (such as 5GC). In other examples, the core network 102 may be configured according to a 4G evolved packet core (EPC), or any other suitable standard or configuration.

Figure 2:
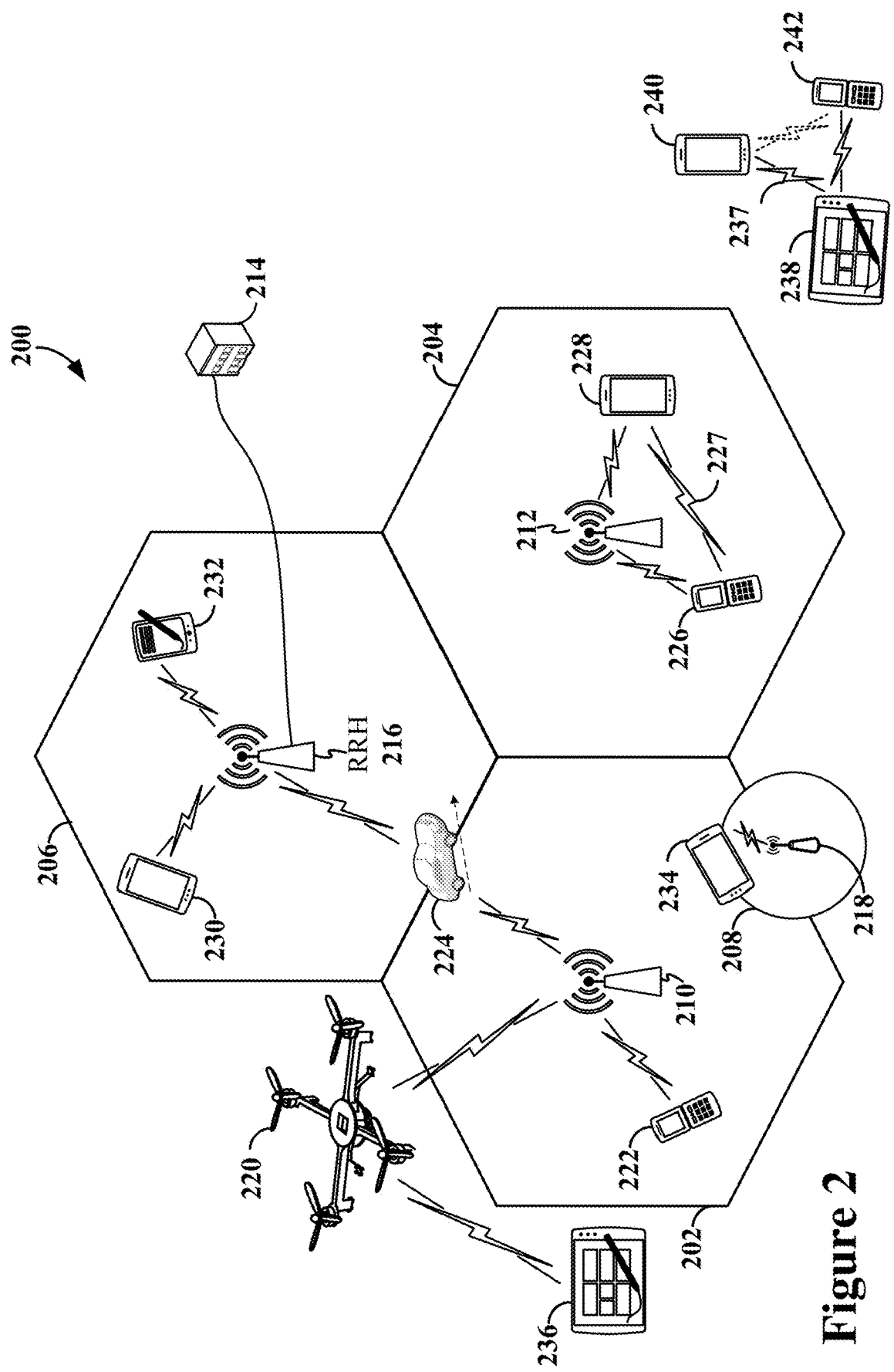
FIG. 2 is a conceptual illustration of an example of a radio access network (RAN).

FIG. 2 is a conceptual illustration of an example of a radio access network (RAN). A schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (such as a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (such as UEs 238, 240 and 242) may communicate with each other using sidelink signals 237 without relaying that communication through a base station. In some examples, the UEs 238, 240, and 242 may each function as a scheduling entity or transmitting sidelink device or a scheduled entity or a receiving sidelink device to schedule resources and communicate sidelink signals 237 therebetween without relying on scheduling or control information from a base station. In other examples, two or more UEs such as UEs 226 and 228) within the coverage area of a base station (such as base station 212) may also communicate sidelink signals 227 over a direct link (sidelink) without conveying that communication through the base station 212. In this example, the base station 212 may allocate resources to the UEs 226 and 228 for the sidelink communication. In either case, such sidelink signaling 227 and 237 may be implemented in a peer-to-peer (P2P) network, a device-to-device (D2D) network, vehicle-to-vehicle (V2V) network, a vehicle-to-everything (V2X), a mesh network, or other suitable direct link network.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (such as unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (such as UE 224) may be concurrently received by two or more cells (such as base stations 210 and 214/216) within the radio access network 200. Each of the cells may measure a strength of the pilot signal, and the radio access network (such as one or more of the base stations 210 and 214/216 or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, where technical rules or limitations may be required to access the spectrum, but the spectrum may still be shared by multiple operators or multiple RATs. For example, the holder of a license for a portion of licensed spectrum may provide licensed shared access (LSA) to share that spectrum with other parties, such as with suitable licensee-determined conditions to gain access.

In order for transmissions over the radio access network 200 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (such as a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, user data traffic is coded using quasi-cyclic low-density parity check (LDPC) with two different base graphs: one base graph is used for large code blocks or high code rates, while the other base graph is used otherwise. Control information and the physical broadcast channel (PBCH) are coded using Polar coding, based on nested sequences. For these channels, puncturing, shortening, and repetition are used for rate matching.

A person having ordinary skill in the art will understand that aspects of the present disclosure may be implemented utilizing any suitable channel code. Various implementations of scheduling entities 108 and scheduled entities 106 may include suitable hardware and capabilities (such as an encoder, a decoder, or a CODEC) to utilize one or more of these channel codes for wireless communication.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, such as several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (such as within paired spectrum). In SDD, transmissions in different directions on a given channel are separated from one another using spatial division multiplexing (SDM). In some other examples, full-duplex communication may be implemented within unpaired spectrum (such as within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform. It should be understood by a person having ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
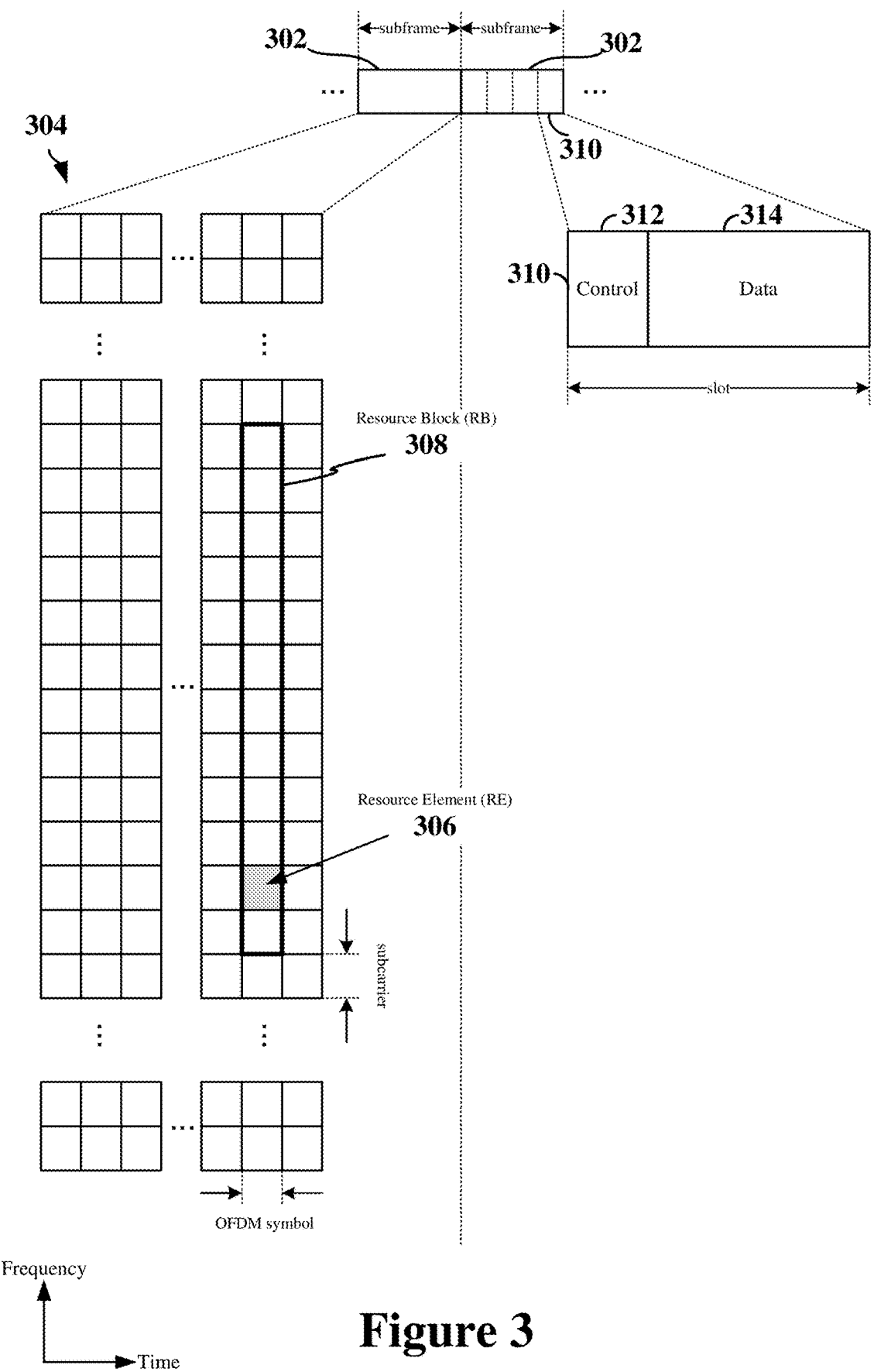
FIG. 3 is a schematic diagram illustrating an example organization of wireless resources in an air interface utilizing orthogonal frequency divisional multiplexing (OFDM).

FIG. 3 is a schematic diagram illustrating an example organization of wireless resources in an air interface utilizing orthogonal frequency divisional multiplexing (OFDM). An expanded view of an example downlink (DL) subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (such as gNB, eNB, etc.) or may be self-scheduled by a UE/sidelink device implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 millisecond (ms) subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (such as one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within a RB 408 may be scheduled to carry one or more physical channels, including control channels, shared channels, data channels, etc. Other REs 306 within the RB 408 also may carry pilots or reference signals. These pilots or reference signals may provide for a receiving device to perform channel estimation of the corresponding channel, which may enable coherent demodulation/detection of the control or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (such as a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (such as a base station) may allocate one or more REs 306 (such as within the control region 312) to carry DL control information including one or more DL control channels, such as a physical downlink control channel (PDCCH), to one or more scheduled entities (such as UEs). The PDCCH carries downlink control information (DCI) including but not limited to power control commands (such as one or more open loop power control parameters or one or more closed loop power control parameters), scheduling information, a grant, or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, where the integrity of packet transmissions may be checked at the receiving side for accuracy, such as utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (such as in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (such as 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (such as default downlink numerology), system frame number, a configuration of a PDCCH control resource set (CORESET) (such as PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (such as UE) may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (such as within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (such as Tx V2X device or other Tx UE) towards a set of one or more other receiving sidelink devices (such as Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 2 and 3 are not necessarily all of the channels or carriers that may be utilized between a scheduling entity and scheduled entities, and a person having ordinary skill in the art will recognize that other channels or carriers may be utilized in addition to those illustrated, such as other traffic, control, and feedback channels.

One such example includes signaling relating to RRM. In an example of RRM related signaling, a scheduled entity (such as a UE) may conduct measurements on the signal quality of neighboring cells for various purposes, such as conducting a handover or adding a component carrier in carrier aggregation. The signal quality can be measured, for example, using reference signal received power (RSRP) or reference signal received quality (RSRQ) metrics of reference signals. In networks such as 5G NR, the cell quality and channel condition parameters may be measured by using synchronization signal blocks (SSBs). Each SSB may include a Primary Synchronization Signal (PSS), a Secondary Synchronization Signal (SSS), and a Physical Broadcast Channel (PBCH). The SSB has a longer transmission periodicity compared to the cell-specific reference signals used in LTE for cell quality measurements. The SSB periodicity for 5G NR can be configured in a suitable range (such as 5, 10, 20, 40, 80, and 160 ms) for each cell in some examples. However, a UE may not measure the cell quality with the same periodicity as the SSB, and the appropriate measurement periodicity can be configured according to the channel condition parameters. Such a configuration may avoid unnecessary measurements and conserve power.

Generally, RSRP may be defined as defined as the linear average over the power contributions (in Watt) of the resource elements that carry the SSS. The measurement time resource(s) for SS-RSRP may be confined within an SS/PBCH Block Measurement Time Configuration (SMTC) window duration. For SS-RSRP determination, demodulation reference signals for PBCH and, if indicated by higher layers, channel state information-reference signals (CSI-RS) in addition to SSS may be used. SS-RSRP determination using demodulation reference signal for PBCH or CSI-RS may be measured by linear averaging over the power contributions of the resource elements that carry corresponding reference signals taking into account power scaling for the reference signals. RSRQ may be generally defined as the ratio of NxSS-RSRP/NR carrier RSSI, where N is the number of resource blocks in the NR carrier RSSI measurement bandwidth. The measurements in the numerator and denominator may be made over the same set of resource blocks.

Figure 4:
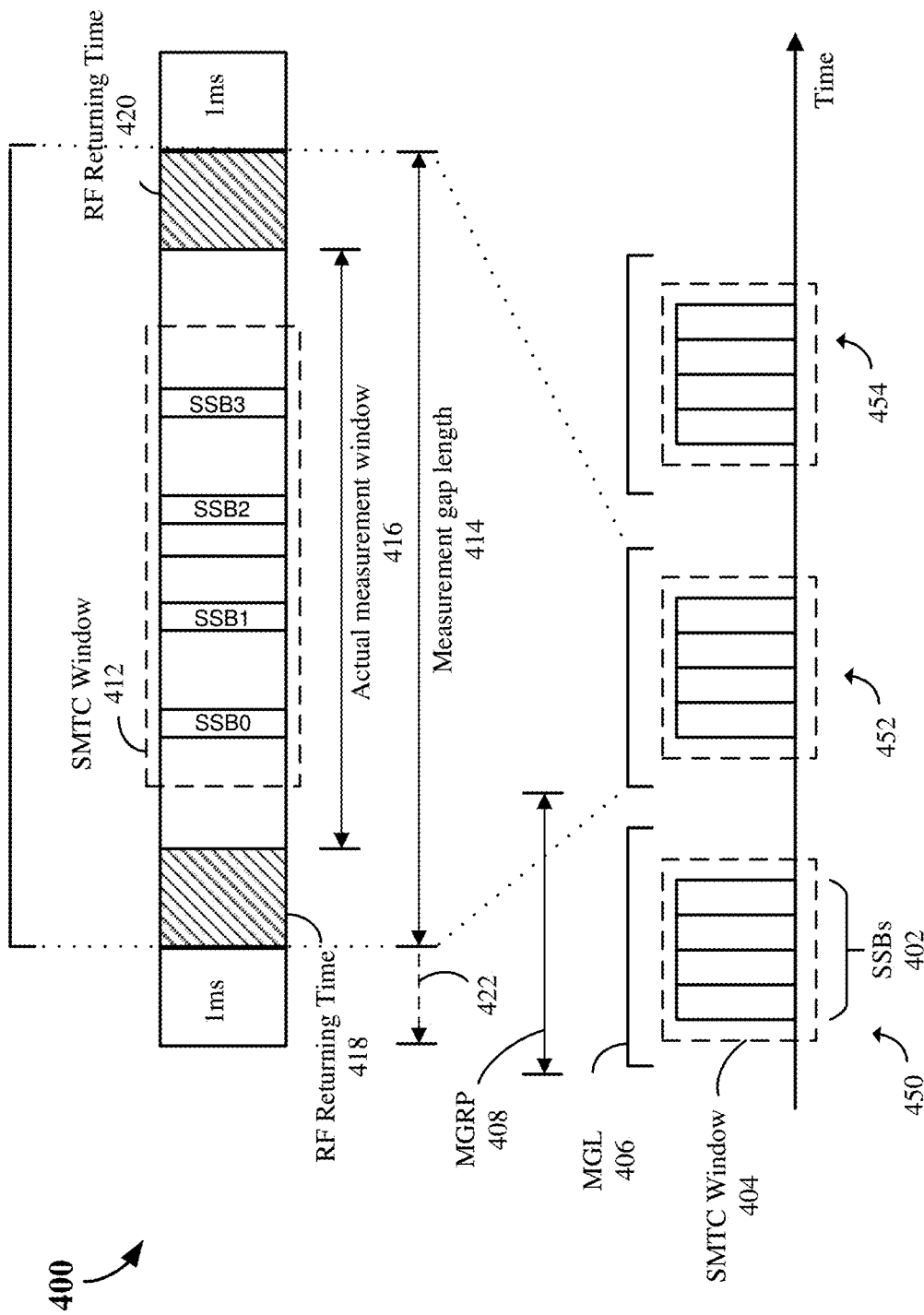
FIG. 4 is a diagram illustrating an example measurement of signal quality for a UE.

FIG. 4 is a diagram illustrating an example measurement of signal quality for a UE. The diagram illustrates a signal diagram 400 showing RRM measurement utilizing SSB-based time configuration windows (SMTC) indicating the periodicity and the timing of the SSBs that the scheduled entity (such as a UE) should use for cell quality measurements and channel condition parameters. It should be understood by those skilled in the art that the signal diagram 400 is simplified for the purposes of understanding, and that alternate configurations that include additional or alternate components are contemplated in the present disclosure.

In this example, three groups of SSB signals 450, 452, 454 each including a plurality of SSB blocks 402, are being received at a scheduled entity cell along a time scale, as shown in the figure. During RRM measurement, each SSB signal (450-454) may be configured with a SMTC window 404 periodicity that can be set in the same range as the SSBs (such as 5, 10, 20, 40, 80, and 160 ms) and the duration of the window can be set to a configured time (such as 1, 2, 3, 4, or 5 ms) associated with the number of SSBs transmitted on the cell that is being measured. A measurement gap length (MGL) 406 and measurement gap repetition period (MGRP) 408 also may be configured as shown in the figure.

A detailed view of SSB signal 452 is shown via the dotted lines in FIG. 4. As can be seen, a plurality of SSB blocks (SSB0-SSB3) are bound by a SMTC window 412 within an actual measurement window 416. In some examples, RF return time blocks (418, 420) may be configured at each end of the actual measurement window 416 in which no data transmission occurs. When a scheduled entity is notified of the SMTC window by a node (such as gNB), it may detect and measure the SSBs (such as SSB0-SSB3) within that window and report the measurement results back to the scheduling entity (such as serving base station). In some examples, the same interface (such as RF transceiver) for measuring neighbor-cell quality or other component carriers, as well as transmitting/receiving data in the serving cell, may be used.

In configurations utilizing LTE, the scheduled entity data transmission in the serving cell may be suspended during a measurement gap, providing the scheduled entity the opportunity to tune its interface to conduct neighbor-cell quality measurements or measurement of other component carriers at different frequencies. A measurement gap length (MGL) 414 may be fixed such that at least one primary/secondary synchronization signal occasion can be observed within the gap. In some examples, the primary/secondary synchronization signals may be transmitted every 5 ms, resulting in a MGL of 6 ms, allowing 0.5 ms for RF tuning in the beginning and in the end of the measurement gap. The scheduled entity may detect synchronization signals within the MGL 406 and identify the cell ID and the reception timing. The scheduled entity may subsequently perform measurements on the cell-specific reference signals (CRS).

In configurations utilizing 5G NR, measurement gaps may be used, where measurements are conducted on SSB. In such configurations, the duration of the SMTC window 412 can be set to match the SSB transmission. However, a fixed MGL 414 could cause potential degradation of the serving cell throughput. In order to minimize such performance degradation, the MGL 414 in 5G NR can be configured to have time periods providing more flexibility (such as 1.5, 3, 3.5, 4, 5.5, or 6 milliseconds (ms)). As can be seen in FIG. 4, a measurement gap configuration may be configured where the SMTC window (such as 412) is set differently from MGLs (such as 414). In such a configuration, the MGRP (such as 408) can be more flexibly configured, compared to LTE. In some examples, the MGRP may be set to support 20, 40, 80, and 160 ms. An interface (such as an RF transceiver) tuning time may be provisioned in the beginning and the end of the measurement gap (418, 420), during which the scheduled entity does not conduct measurements or transmit/receive data. In some examples, the SMTC window (such as 412) and the measurement gap (such as 414) may be configured to start at the same time, where the start of the SMTC window may overlap with the RF retuning time (such as 418, 420) in which the scheduled entity may not be able to perform measurements during that time. In some configurations, by utilizing a measurement gap length (such as 414) as well as a measurement gap timing advance function (422), all SSBs available for measurement may be measured within the SMTC window by advancing the start of the RF retuning gap.

The SMTC window 412 and the measurement gap length 414 may be configured based on the SSB transmission timing for the candidate cell. However, in some cases when measuring other cells, a scheduling entity (such as a serving base station) may not be aware of the SSB transmission timing. In such cases, it may be difficult to properly set the SMTC window and measurement gap for the scheduled entity. Therefore, a subframe (SFN) and frame timing difference (SFTD) measurement function may be used, where the scheduled entity may measure the timing difference of the SFN and the frame boundary between the serving cell and the candidate cell and report this information to the scheduling entity (such as serving gNB). The scheduling entity may configure SFTD measurements for a scheduled entity's neighbor cells. For a scheduled entity to perform SFTD measurements on neighboring cells to which it is not connected, measurement gaps may be used, where the scheduling entity may configure the measurement gaps with different lengths, until the terminal can detect the SSB of a neighboring cell. Alternately or in addition, SFTD measurement of neighboring cells may be performed without using measurement gaps, while maintaining the scheduled entity's transmission/reception in the current cell. Instead of stopping transmission/reception of data by the RF device to perform measurements, carrier aggregation may be used on the RF interface (transceiver), where the scheduled entity may transmit/receive data in the current cell while SFTD measurements for neighboring cells are being performed.

When a scheduled entity (such as UE) has switched on and a network (such as Public Land Mobile Network) has been selected, a cell selection process takes place, allowing the scheduled entity to select a suitable cell where to camp on in order to access available services. In this process, the scheduled entity can use stored information (stored information cell selection) or not (initial cell selection). During a cell reselection process, a scheduled entity may select a more suitable cell, and camp on it. When the scheduled entity is in either Camped Normally state or Camped on Any Cell state on a cell, the scheduled entity may attempt to detect, synchronize, and monitor intra-frequency, inter-frequency and inter-RAT cells indicated by the serving cell. For intra-frequency and inter-frequency cells, the serving cell may not provide an explicit neighbor list but may provide carrier frequency information and bandwidth information. Scheduled entity measurement activity also may be controlled by measurement rules, allowing the scheduled entity to limit its measurement activity.

In some examples, for idle mode cell re-selection purposes, the scheduled entity may be capable of monitoring at least intra-frequency carriers, inter-frequency carriers, Evolved Universal Mobile Telecommunications System Terrestrial Radio Access (E-UTRA) inter-RAT carriers, or E-UTRA intra-RAT carriers. In addition, a scheduled entity supporting E-UTRA measurements in an idle (such as RRC_IDLE) state may be capable of monitoring a plurality (such as at least 14) of carrier frequency layers, which includes a serving layer that includes any combination of E-UTRA FDD, E-UTRA TDD and NR layers. For measurement and evaluation of a serving cell, the scheduled entity may measure the SS-RSRP and SS-RSRQ level of the serving cell and evaluate a cell selection criterion S for the serving cell for a discontinuous reception (DRX) at least once every M1*N1 DRX cycle; where:

M1=2 if SMTC periodicity ($T_{SMTC}$)>20 ms and DRX cycle≤0.64 second, otherwise M1=1.

The scheduled entity may filter the SS-RSRP and SS-RSRQ measurements of the serving cell using at least 2 measurements. Within the set of measurements used for the filtering, at least two measurements may be spaced by, at least DRX cycle/2. If the scheduled entity has evaluated in consecutive DRX cycles that the serving cell does not fulfil the cell selection criterion S, the scheduled entity initiates the measurements of all neighbor cells indicated by the serving cell, regardless of the measurement rules currently limiting scheduled entity measurement activities. A similar configuration may be arranged for inactive mode cell-reselection.

FIG. 5 is a table 500 showing example parameters for measurement of intra-frequency cells for a scheduled entity. The table 500 shows various DRX cycle lengths 502 and scaling factors (N1) 504 used for frequency ranges FR1 (such as sub-6 GHz) and FR2 (such as 24.25-52.6 GHz), as shown in the figure. For measurement of intra-frequency cells, the scheduled entity may identify new intra-frequency cells and perform SS-RSRP and SS-RSRQ measurements of the identified intra-frequency cells without an explicit intra-frequency neighbor list containing physical layer cell identities. The scheduled entity may then evaluate whether a newly detectable intra-frequency cell meets a reselection criteria within an intra-detection time interval ($T_{detect,NR\_Intra}$) shown in 506, where the scaling factor N1 may be defined from FR1 and FR2 (504), and M2 may be set to 1.5 if the SMTC periodicity of measured intra-frequency is greater than 20 ms, and otherwise M2=1. An intra frequency cell is considered to be detectable according to SSB measurement conditions, such as received (linear) average power of the resource elements that carry SSB signals and channels, detected in operating band groups (such as FDD, TDD). The scheduled entity may measure SS-RSRP and SS-RSRQ at least every period ($T_{measure,NR\_Intra}$) shown in 508 for intra-frequency cells that are identified and measured according to configured measurement rules. As with detection time interval 506, the scaling factor N1 may be defined from FR1 and FR2 (504), and M2 may be set to 1.5 if the SMTC periodicity of measured intra-frequency is greater than 20 ms, and otherwise M2=1.

The scheduled entity may filter SS-RSRP and SS-RSRQ measurements of each measured intra-frequency cell using at least 2 measurements. Within the set of measurements used for the filtering, at least two measurements may be spaced by at least $T_{measure,NR\_Intra}/2$. For an intra-frequency cell that has been already detected, but that has not been reselected to, the filtering may be such that the UE is capable of evaluating that the intra-frequency cell has met a reselection criterion within the intra-measurement time period ($T_{evaluate,NR\_Intra}$) 510 when $T_{reselection}=0$ as shown in FIG. 5 provided that, when rangeToBestCell is not configured, the cell is ranked at least a certain amount better (such as 3 dB) in FR1 or in FR2 (such as 4.5 dB better). When rangeToBestCell is configured, the reselection may be based on the cell that has the highest number of beams above the threshold absThreshSS-BlocksConsolidation among all detected cells whose cell-ranking criterion R value is within rangeToBestCell of the cell-ranking criterion R value of the highest ranked cell. If there are multiple such cells, the cell has the highest rank among them the cell is ranked at least a certain amount better (such as 3 dB) in FR1 or in FR2 (such as 4.5 dB better). When evaluating cells for reselection, the SSB side conditions may apply to both serving and non-serving intra-frequency cells. If $T_{reselection}$ timer has a non zero value and the intra-frequency cell is satisfied with the reselection criteria, the scheduled entity may evaluate this intra-frequency cell for the $T_{reselection}$ time. If this cell remains satisfied with the reselection criteria within this duration, then the scheduled entity may reselect that cell.

FIG. 6 is a table 600 showing example parameters for measurement of inter-frequency cells for a scheduled entity. The table 600 shows various DRX cycle lengths 602 and scaling factors (N1) 604 used for frequencies ranges FR1 (such as sub-6 GHz) and FR2 (such as 24.25-52.6 GHz), as shown in the figure. For measurement of inter-frequency cells, the scheduled entity is able to identify new inter-frequency cells and perform SS-RSRP or SS-RSRQ measurements of identified inter-frequency cells if carrier frequency information is provided by the serving cell, even if no explicit neighbor list with physical layer cell identities is provided. For a cell selection RX level value (dB) $S_{rxlev}$ and cell selection quality value (dB) $S_{qual}$, if $S_{rxlev} > S_{nonIntraSearchP}$ and $S_{qual} > S_{nonIntraSearchQ}$ then the scheduled entity may search for inter-frequency layers of higher priority at least every $T_{higher\_priority\_search}$, where $S_{nonIntraSearchP}$ represents a threshold of current cell $S_{rxlev}$ to perform inter-frequency or interRAT measurement, and $S_{nonIntraSearchQ}$ represents threshold of current cell $S_{qual}$ to perform inter-frequency or interRAT measurement. If $S_{rxlev} < S_{nonIntraSearchP}$ or $S_{qual} S_{nonIntraSearchQ}$ then the scheduled entity shall search for and measure inter-frequency layers of higher, equal or lower priority in preparation for possible reselection. In this example, the minimum rate at which the scheduled entity is required to search for and measure higher priority layers may be the same. The inter-detection time intervals 606 ($T_{detect,NR\_Inter}$) for given DRX cycle lengths are shown in FIG. 6.

The scheduled entity may be able to evaluate whether a newly detectable inter-frequency cell meets the reselection criteria within $K_{carrier}*T_{detect,NR\_Inter}$ if at least carrier frequency information is provided for inter-frequency neighbor cells by the serving cells when $T_{reselection}=0$, provided that the reselection criteria is met by a margin of a configured amount (such as at least 5 dB) in FR1 or in FR2 (such as 6.5 dB) for reselections based on ranking, or a configured amount in FR1 (such as 6 dB) or in FR2 (such as 7.5 dB) for SS-RSRP reselections based on absolute priorities, or a configured amount in FR1 (such as 4 dB) and 4 dB in FR2 (such as 4 dB) for SS-RSRQ reselections based on absolute priorities. The parameter $K_{carrier}$ represents the number of NR inter-frequency carriers indicated by the serving cell.

When higher priority cells are found by the higher priority search, they may be measured at least every time interval 608 ($T_{measure,NR\_Inter}$) as shown. If, after detecting a cell in a higher priority search, it is determined that reselection has not occurred, then the scheduled entity may not continuously measure the detected cell to evaluate the ongoing possibility of reselection. However, minimum measurement filtering requirements may still be met by the scheduled entity before it makes any determination that it may stop measuring the cell. The scheduled entity may measure SS-RSRP or SS-RSRQ at least every $K_{carrier}*T_{measure,NR\_Inter}$ as shown in table 500 for identified lower or equal priority inter-frequency cells. The UE may filter SS-RSRP or SS-RSRQ measurements of each measured higher, lower and equal priority inter-frequency cell using at least 2 measurements. Within the set of measurements used for the filtering, at least two measurements may be spaced by at least $T_{measure,NR\_Inter}/2$.

For an inter-frequency cell that has been already detected, but that has not been reselected to, the filtering may be such that the scheduled entity may be capable of evaluating that the inter-frequency cell has met reselection criterion within $K_{carrier}*T_{evaluate,NR\_Inter}$ when $T_{reselection}=0$. The reselection criteria may be met by a condition when performing equal priority reselection, and when rangeToBestCell is not configured, where the cell is better ranked by a certain amount (such as at least 5 dB) in FR1 or better ranked in FR2 (such as 6.5 dB). Alternately, when rangeToBestCell is configured, reselection may be based on the cell having the highest number of beams above the threshold absThreshSS-Blocks-Consolidation among all detected cells whose cell-ranking criterion R value is within rangeToBestCell of the cell-ranking criterion R value of the highest ranked cell. In some examples, if there are multiple such cells, the cell having the highest rank among them would include a cell being a configured amount (such as at least 5 dB) better ranked in FR1 or in FR2 (such as 6.5 dB) if the current serving cell is among them. or a configured amount (such as 6 dB) in FR1 or in FR2 (such as 7.5 dB) for SS-RSRP reselections based on absolute priorities, or a configured amount (such as 4 dB) in FR1 or in FR2 (such as 4 dB) for SS-RSRQ reselections based on absolute priorities.

When evaluating cells for reselection, the SSB side conditions may apply to both serving and inter-frequency cells. If a $T_{reselection}$ timer has a non zero value and the inter-frequency cell is satisfied with the reselection criteria, the scheduled entity may evaluate this inter-frequency cell for the $T_{reselection}$ time. If this cell remains satisfied with the reselection criteria within this duration, then the scheduled entity may reselect that cell.

FIG. 7 is a table 700 showing example parameters for measurement of inter-RAT E-UTRAN cells for a scheduled entity. The table 700 shows various DRX cycle lengths 702 for measurements of inter-RAT E-UTRAN cells using various E-UTRAN detect time intervals ($T_{detect,EUTRAN}$) 704, measurement time intervals ($T_{measure,EUTRAN}$) 706 and evaluation time intervals ($T_{evaluate,EUTRAN}$) 708. In this example, if cell selection RX level value $S_{rxlev}>S_{nonIntraSearchP}$ and cell selection quality value $S_{qual}>S_{nonIntraSearchQ}$ then the scheduled entity may search for inter-RAT E-UTRAN layers of higher priority at least every $T_{higher\_priority\_search}$ (such as $60*N_{layers}$, Paging Cycle*$N_{layers}$, Paging Cycle). If $S_{rxlev}\leq S_{nonIntraSearchP}$ or $S_{qual}\leq S_{nonIntrasearchQ}$ then the scheduled entity may search for and measure inter-RAT E-UTRAN layers of higher, lower priority in preparation for possible reselection. In this example, the minimum rate at which the scheduled entity searches for and measures higher priority inter-RAT E-UTRAN layers may be the same as that for lower priority RATs.

Similar configurations and measurement rules may be applied for inter-RAT E-UTRAN FDD measurements and E-UTRA TDD measurements. When the measurement rules indicate that inter-RAT E-UTRAN cells are to be measured, the scheduled entity shall measure RSRP and RSRQ of detected E-UTRA cells in the neighbor frequency list at a minimum measurement rate configured by the system. The parameter $N_{EUTRA\_carrier}$ is the total number of configured E-UTRA carriers in the neighbor frequency list. The scheduled entity may filter RSRP and RSRQ measurements of each measured E-UTRA cell using at least 2 measurements. Within the set of measurements used for the filtering, at least two measurements may be spaced by at least $T_{measure,EUTRAN}/2$.

An inter-RAT E-UTRA cell is considered to be detectable under any or all of a plurality of conditions. In one example, an inter-RAT E-UTRA cell is considered to be detectable if the same conditions as for inter-frequency RSRP measurements are fulfilled for a corresponding band. Another condition is when the same conditions as for inter-frequency RSRQ measurements are fulfilled for a corresponding band. A further condition is when SCH conditions are fulfilled for a corresponding Band. The scheduled entity is able to evaluate whether a newly detectable inter-RAT E-UTRAN cell meets the reselection criteria within ($N_{EUTRA\_carrier}$) *$T_{detect,EUTRAN}$ when $S_{rxlev}\leq S_{nonIntraSearchP}$ or $S_{qual}\leq S_{nonIntraSearchQ}$ when $T_{reselection}=0$ provided that the reselection criteria is met by a margin of a configured amount (such as at least 6 dB) for RSRP reselections based on absolute priorities or a configured amount (such as 4 dB) for RSRQ reselections based on absolute priorities.

Cells that have been detected may be measured at least every ($N_{EUTRA\_carrier}$)*$T_{measure,EUTRAN}$ when $S_{rxlev}\leq S_{nonIntraSearchP}$ or $S_{qual}\leq S_{nonIntraSearchQ}$. When higher priority cells are found by the higher priority search, they may be measured at least every $T_{measure,EUTRAN}$. If, after detecting a cell in a higher priority search, it is determined that reselection has not occurred, then the scheduled entity may not be required to continuously measure the detected cell to evaluate the ongoing possibility of reselection. However, the minimum measurement filtering requirements should still be met by the scheduled entity before it makes any determination that it may stop measuring the cell.

For a cell that has been already detected, but that has not been reselected to, the filtering shall be such that the scheduled entity shall be capable of evaluating that an already identified inter-RAT E-UTRA cell has met reselection criterion within ($N_{EUTRA\_carrier}$)*$T_{evaluate,EUTRAN}$ when $T_{reselection}=0$ as shown in FIG. 7 provided that the reselection criteria is met by a margin of a configured amount (such as at least 6 dB) for RSRP reselections based on absolute priorities or a configured amount (such as 4 dB) for RSRQ reselections based on absolute priorities. If a $T_{reselection}$ timer has a non zero value and the inter-RAT E-UTRA cell is satisfied with the reselection criteria, the scheduled entity may evaluate this E-UTRA cell for the $T_{reselection}$ time. If this cell remains satisfied with the reselection criteria within this duration, then the scheduled entity may reselect that cell.

Figure 8:
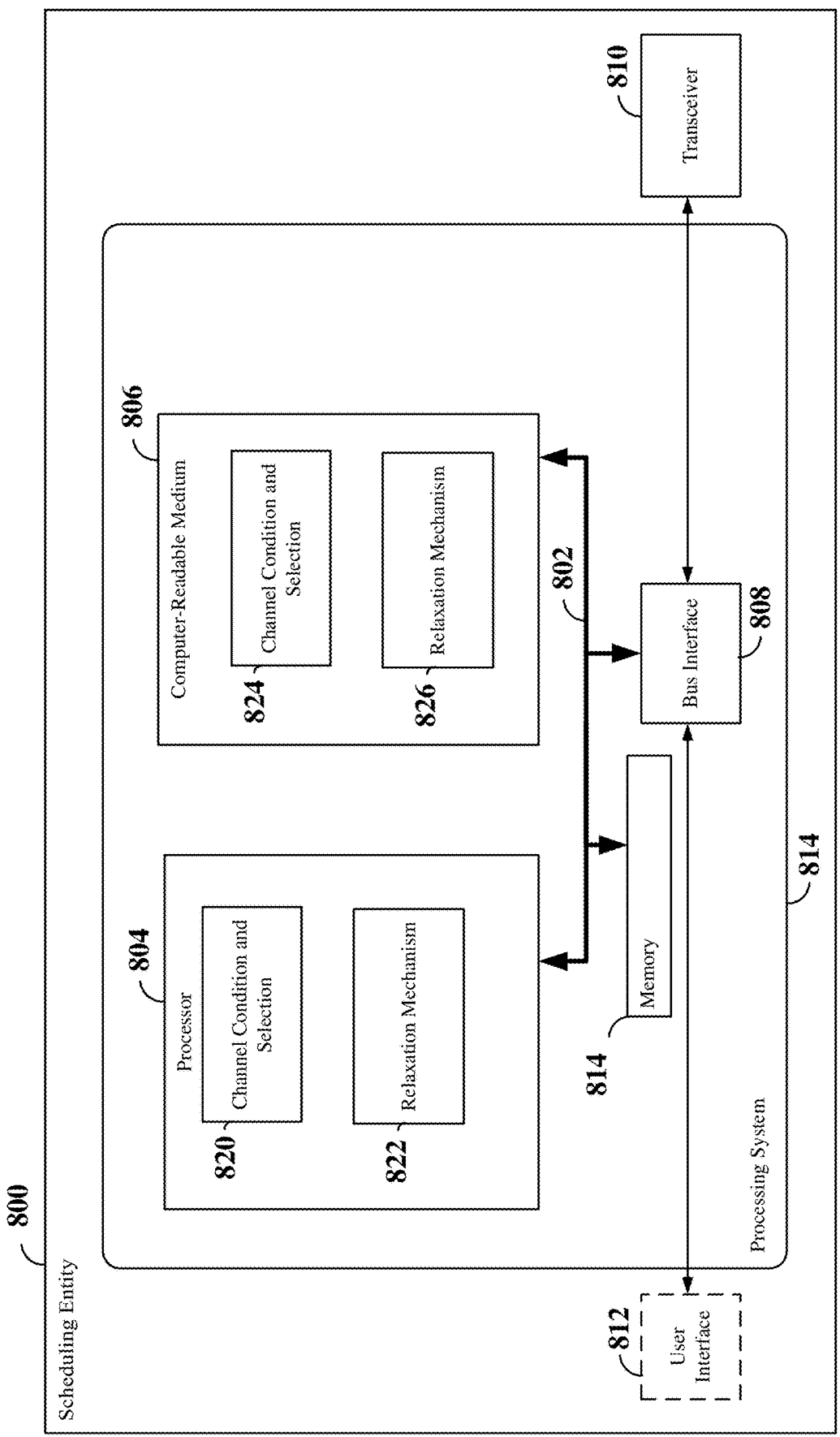
FIG. 8 is a block diagram illustrating an example of a hardware implementation for a scheduling entity.

FIG. 8 is a block diagram illustrating an example of a hardware implementation for a scheduling entity 800. The scheduling entity 800 is shown employing a processing system 814. For example, the scheduling entity 800 may be a base station (such as eNB, gNB), IAB node, or other scheduling entity as illustrated in any one or more of FIGS. 1 and 2.

The scheduling entity 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 800 may be configured to perform any one or more of the functions described herein. That is, the processor 804, as utilized in a scheduling entity 800, may be used to implement any one or more of the processes and procedures described herein.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 814, and computer-readable media (represented generally by the computer-readable medium 806). The bus 802 also may link various other circuits such as timing sources, peripherals, voltage regulators, and power management circuits, which are well known in the art, and therefore, will not be described any further. A bus interface 808 provides an interface between the bus 802 and a transceiver 810. The transceiver 810 provides a communication interface or means for communicating with various other apparatus over a transmission medium (such as air). Depending upon the nature of the apparatus, a user interface 812 (such as keypad, display, speaker, microphone, joystick, touchscreen) also may be provided. Of course, such a user interface 812 is optional, and may be omitted in some examples.

The processor 804 is responsible for managing the bus 802 and general processing, including the execution of software stored on the computer-readable medium 806 or memory 814. The software, when executed by the processor 804, causes the processing system 814 to perform the various functions described herein for any particular apparatus. The computer-readable medium 806 and the memory 814 also may be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (such as hard disk, floppy disk, magnetic strip), an optical disk (such as a compact disc (CD) or a digital versatile disc (DVD)), a smart card, a flash memory device (such as a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software or instructions that may be accessed and read by a computer. The computer-readable medium 806 may reside in the processing system 814, external to the processing system 814, or distributed across multiple entities including the processing system 814. The computer-readable medium 806 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include channel condition and selection circuitry 820 and relaxation mechanism circuitry 822, configured to manage scheduled entities (such as UEs) for communication within the network. Channel condition and selection circuitry 820 may be configured to synchronize and establish connections with scheduled entities, determine or receive channel condition information or engage or assist in cell selection/reselection procedures. Channel condition and selection circuitry 820 also may be configured to generate and transmit signals, such as a random-access channel (RACH) signals, Synchronization Signal (SS) blocks, PBCH or other signal that conveys minimum system information, for use by the scheduled entity. In some examples, the signal may include the link distance between the scheduling entity and the scheduled entity, the location of the scheduling entity (and possibly the location of the scheduled entity). In some examples, the signals may be transmitted using a different carrier frequency or radio access technology (RAT) from the transmission of the RACH signal. Channel condition and selection circuitry 820 also may be configured to determine, using channel condition parameters, if a scheduled entity is in a high-, medium-, or low-mobility state, as well as if a scheduled entity is in a cell-edge or not-at-cell edge condition.

Relaxation mechanism circuitry 822 is configured to store and transmit to scheduled entities one or more of a plurality of relaxation mechanisms. In some illustrative implementations, relaxation mechanism circuitry 822 includes rules or parameters associated with conducting specific cell measurements given specific channel conditions. For example, relaxation measurement circuitry 822 may include rules associating various channel conditions, such as RSRP, RSRQ with different measurement mechanisms, such as intra-frequency, inter-frequency and inter-RAT measurement, along with different parameters (such as time intervals, scaling factors (N1)) configured for each relaxation measurement mechanism. During operation, scheduling entity 800 may transmit the relaxation mechanisms, and associated rules, to a scheduled entity for execution, described in greater detail below. During operation, channel condition and selection circuitry 820 and relaxation mechanism circuitry 822 may utilize channel condition and selection data or software 824 and relaxation mechanism software data or software stored on computer-readable medium 806 as is shown in the figure.

Figure 9:
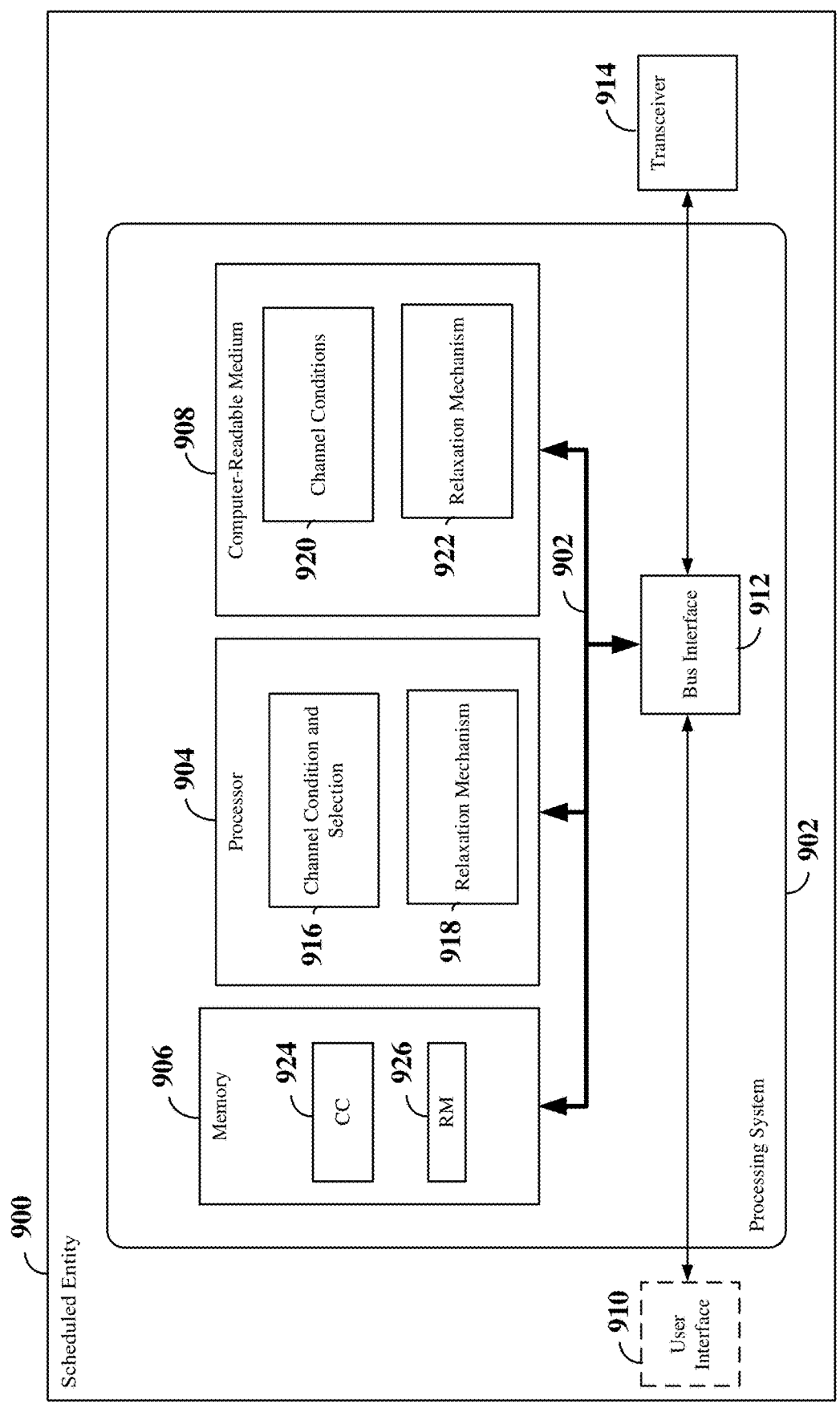
FIG. 9 is a block diagram illustrating an example of a hardware implementation for a scheduled entity.

FIG. 9 is a block diagram illustrating an example of a hardware implementation for a scheduled entity 900. The scheduled entity 900 is shown employing a processing system 902. In accordance with various aspects of the disclosure, an element, or any portion of an element, or any combination of elements may be implemented with a processing system 902 that includes one or more processors 904. For example, the scheduled entity 900 may be a user equipment (UE), IAB node, or other type of scheduled entity as illustrated in FIGS. 1 and 2.

The processing system 902 may be substantially the same as the processing system 814 illustrated in FIG. 8, including a bus interface 912, a bus 902, memory 906, a processor 904, and a computer-readable medium 908. Furthermore, the scheduled entity 900 may include an optional user interface 910 and a transceiver 914 substantially similar to those described above in FIG. 8. That is, the processor 904, as utilized in a scheduled entity 900, may be used to implement any one or more of the processes described herein and illustrated in the various figures.

In some aspects of the disclosure, the processor 904 may include channel condition and selection circuitry 916 and relaxation mechanism circuitry 918. In some examples, operational data for the channel condition and selection circuitry 916 and relaxation mechanism circuitry 918 may be received via an interface, such as transceiver 914, from a scheduling entity (such as the scheduling entity 800), and loaded into computer-readable medium 908 or memory 906 as operational modules 920-922 and 924-926, respectively. In some examples, the operational data for the channel condition and selection circuitry 916 and relaxation mechanism circuitry 918 may be pre-loaded into computer-readable medium 908 or memory 906. During operation, channel condition and selection circuitry 916 processes signals from the transceiver to determine channel conditions or parameters. In some illustrative implementations, the channel conditions include RSRP and RSRQ measurements are taken over a configured time period. A person having ordinary skill in the art will understand that other measurement relating to channel conditions, such as signal-to-noise and interference ratio (SINR), and other signal characteristics, are contemplated in the present disclosure. SINR may be defined as the linear average over the power contribution (in Watt) of the resource elements carrying SSS divided by the linear average of the noise and interference power contribution (in Watt) over the resource elements carrying SSS within the same frequency bandwidth. The channel conditions or parameters may include discrete measurements of channel conditions for a point in time, as well as channel condition variations (such as rates of change) over a configured period of time.

Once the channel condition and selection circuitry 916 determines channel conditions or parameters, the channel condition and selection circuitry 916 detects if the channel conditions or parameters meet one or more characteristics, including, but not limited to, one or more thresholds or rates of change in the channel conditions or parameters. For example, the channel condition and selection circuitry 916 may determine that an RSRP or an RSRQ measurement is above or below a configured threshold. In another example, the channel condition and selection circuitry 916 may determine that a rate of change of RSRP or RSRQ measurement are above or below a configured threshold. A channel condition, such as a low-mobility condition or a not-at-cell-edge condition may then be determined from the measurements and detected characteristics. Depending on the specific configuration, the channel condition and selection circuitry 916 uses the detected channel characteristic(s) to implement a relaxation mechanism associated with the characteristic(s) in relaxation mechanism circuitry 918.

In one example, the relaxation mechanism may include, but is not limited to, performing intra-frequency, inter-frequency and inter-RAT measurements of neighboring cells ($N_{cell}$) at regular time intervals using interval data provided by relaxation mechanism data stored in block 922 or 926. In another example, the relaxation mechanism may include, but is not limited to, performing intra-frequency, inter-frequency and inter-RAT measurements of neighboring cells ($N_{cell}$) at modified time intervals (such as using a modified time scaling factor N1) using interval data provided by relaxation mechanism data stored in block 922 or 926. In a further example, the relaxation mechanism may include, but is not limited to, not performing any intra-frequency, inter-frequency and inter-RAT measurements of neighboring cells for a configured time period.

Figure 10:
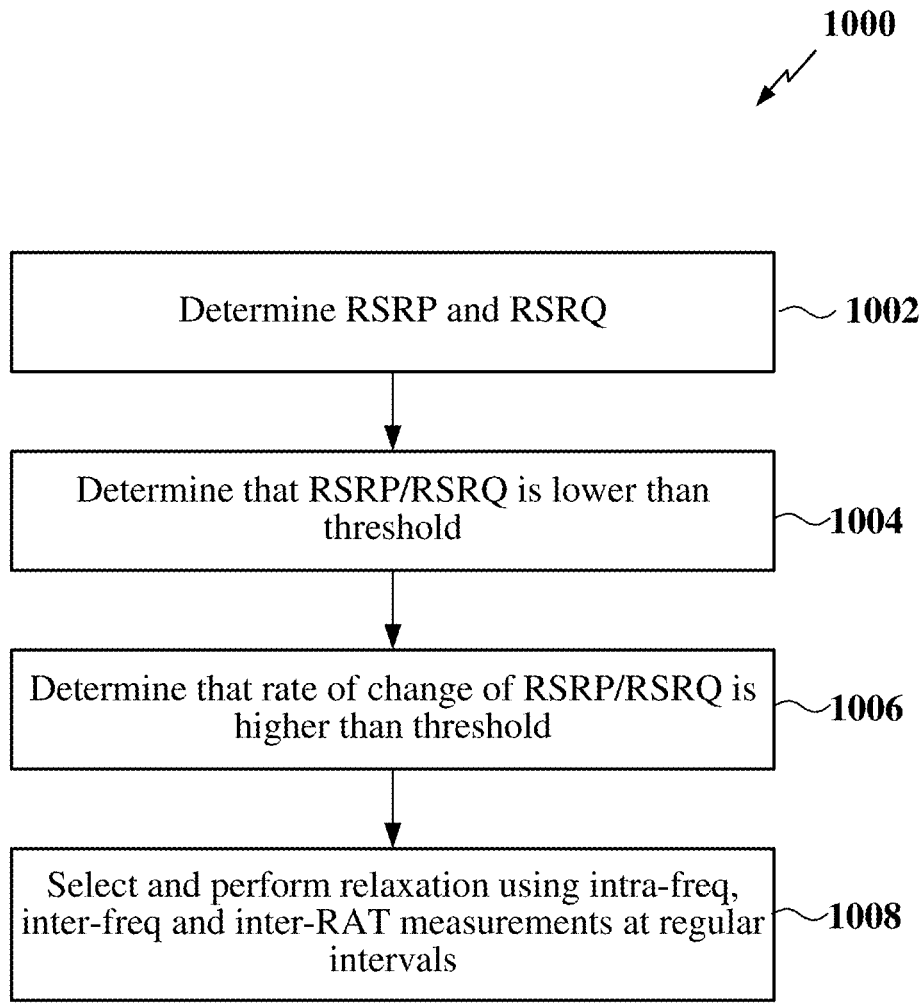
FIG. 10 is an example flowchart for determining channel conditions and performing relaxation on cell radio resource management (RRM) measurement.

FIG. 10 is an example flowchart 1000 for determining channel conditions and performing relaxation on cell radio resource management (RRM) measurement. A scheduled entity (such as a UE) determines a channel condition by measuring and determining RSRP and RSRQ of a serving cell in block 1002. For example, the channel condition and selection circuitry 916, together with the transceiver 914 described above in connection with FIG. 9 may provide a means to measure and determining RSRP and RSRQ of a serving cell. In block 1004, the scheduled entity determines that the measured RSRP and RSRQ of the serving cell are lower than a configured threshold, indicating that the scheduled entity is at a cell edge, since the RSRP/RSRQ is lower than a configured threshold. In some examples, the channel condition and selection circuitry 916, together with the transceiver 914 described above in connection with FIG. 9 may provide a means to determine that the measured RSRP and RSRQ of the serving cell are lower than a configured threshold.

In block 1006, the scheduled entity determines that the measured rate of change for RSRP and RSRQ in the serving cell are higher than another predetermined threshold, indicating that the scheduled entity is experiencing a high rate of mobility, as the rate of change of the serving cell RSRP/RSRQ within a configured time period is higher than a configured (such as default) threshold. In this example, the channel conditions determined in blocks 1004 and 1006 (cell edge, high mobility) cause the scheduled entity to select and perform relaxation using inter-frequency, inter-frequency and inter-RAT measurements for a neighboring cell ($N_{cell}$) at regular time intervals, defined by relaxation mechanism data, for example, stored (such as via 922) on the scheduled entity. In some examples, the channel condition and selection circuitry 916, and the relaxation mechanism circuitry 918, together with the transceiver 914 described above in connection with FIG. 9 may provide a means to determine the measured rate(s) of change for RSRP and RSRQ in the serving cell and select and perform relaxation using intra-frequency, inter-frequency and inter-RAT measurements for a neighboring cell ($N_{cell}$).

Figure 11:
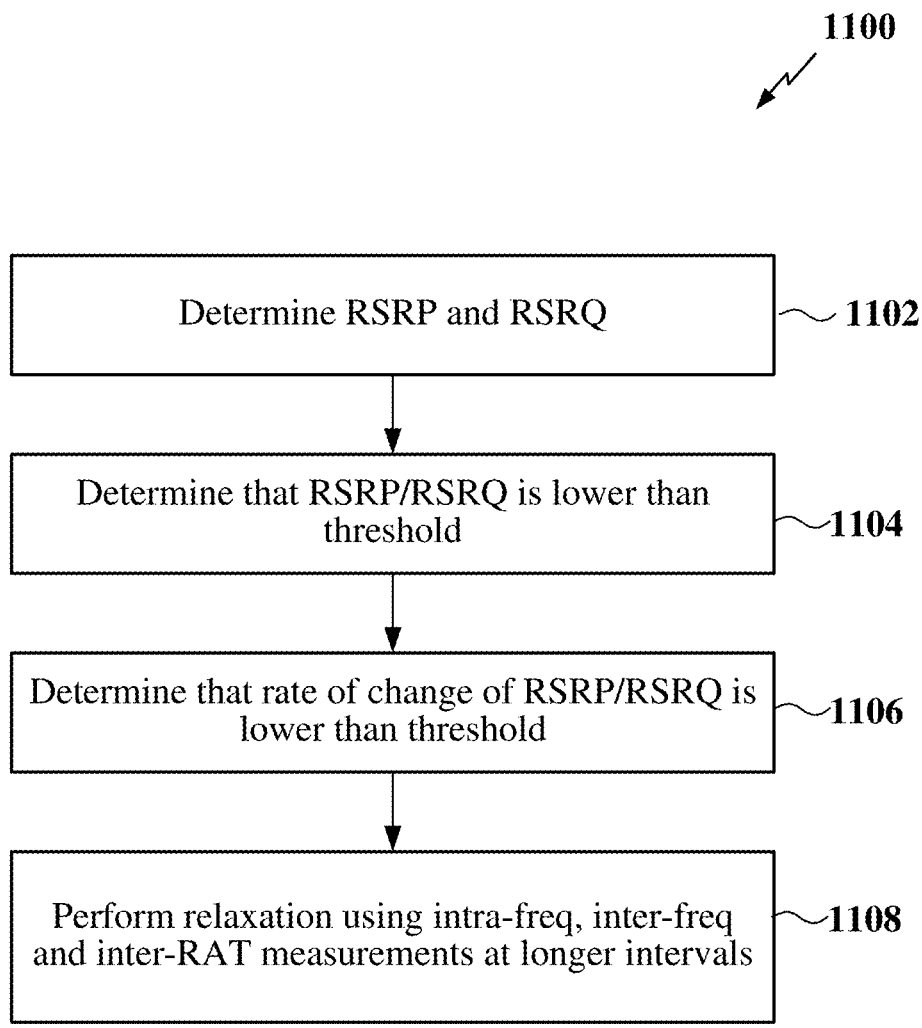
FIG. 11 is another example flowchart for determining channel conditions and performing relaxation on cell radio resource management (RRM) measurement.

FIG. 11 is another example flowchart 1100 for determining channel conditions and performing relaxation on cell radio resource management (RRM) measurement. A scheduled entity (such as UE) determines a channel condition by measuring and determining RSRP and RSRQ of a serving cell in block 1102. In block 1104, the scheduled entity determines that the measured RSRP and RSRQ of the serving cell are lower than a configured threshold, indicating that the scheduled entity is at a cell edge, since the RSRP/RSRQ is lower than a configured threshold. In some examples, the channel condition and selection circuitry 916, together with the transceiver 914 described above in connection with FIG. 9 may provide a means to measure and determining RSRP and RSRQ and threshold levels of a serving cell.

In block 1106, the scheduled entity determines that the measured rate of change for RSRP and RSRQ in the serving cell are lower than another predetermined threshold, indicating that the scheduled entity is experiencing a low (or no) rate of mobility, as the rate of change of the serving cell RSRP/RSRQ within a configured time period is lower than a configured (such as default) threshold. In this example, the channel conditions determined in blocks 1104 and 1106 (on cell edge, low mobility) cause the scheduled entity to select and perform relaxation using intra-frequency, inter-frequency and inter-RAT measurements for a neighboring cell ($N_{cell}$) at modified (such as longer), time intervals defined by relaxation mechanism data, for example, stored (such as via 922) on the scheduled entity. In one example, the time intervals are modified by using a scaling factor (N1) or other suitable mechanism. In some examples, the channel condition and selection circuitry 916, and the relaxation mechanism circuitry 918, together with the transceiver 914 described above in connection with FIG. 9 may provide a means to determine the measured rate(s) of change for RSRP and RSRQ in the serving cell and select and perform relaxation using intra-frequency, inter-frequency and inter-RAT measurements for a neighboring cell, as described above.

Figure 12:
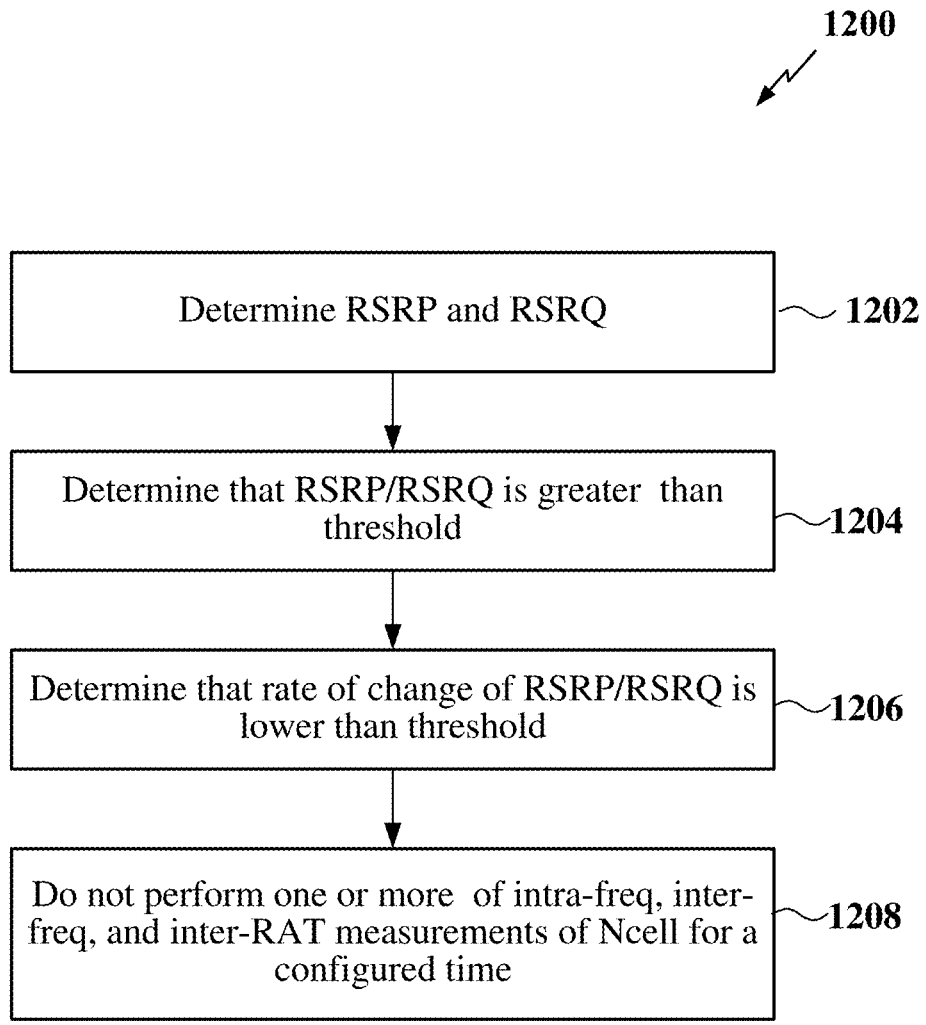
FIG. 12 is yet another example flowchart for determining channel conditions and performing relaxation on cell radio resource management (RRM) measurement.

FIG. 12 is yet another example flowchart 1200 for determining channel conditions and performing relaxation on cell radio resource management (RRM) measurement. A scheduled entity (such as UE) determines a channel condition by measuring and determining RSRP and RSRQ of a serving cell in block 1202. In block 1204, the scheduled entity determines that the measured RSRP and RSRQ of the serving cell are greater than a configured threshold, indicating that the scheduled entity is not at a cell edge, since the RSRP/RSRQ is higher than a configured threshold. In some examples, the channel condition and selection circuitry 916, together with the transceiver 914 described above in connection with FIG. 9 may provide a means to measure and determining RSRP and RSRQ and threshold levels of a serving cell.

In block 1206, the scheduled entity determines that the measured rate of change for RSRP and RSRQ in the serving cell are lower than another predetermined threshold, indicating that the scheduled entity is experiencing a low (or no) rate of mobility, as the rate of change of the serving cell RSRP/RSRQ within a configured time period is lower than a configured (such as default) threshold. In this example, the channel conditions determined in blocks 1204 and 1206 (not-at-cell edge, low mobility) cause the scheduled entity to not perform relaxation using inter-frequency, inter-frequency and inter-RAT measurements for a neighboring cell ($N_{cell}$) for a configured time interval defined by relaxation mechanism data, for example, stored (such as via 922) on the scheduled entity.

Figure 13:
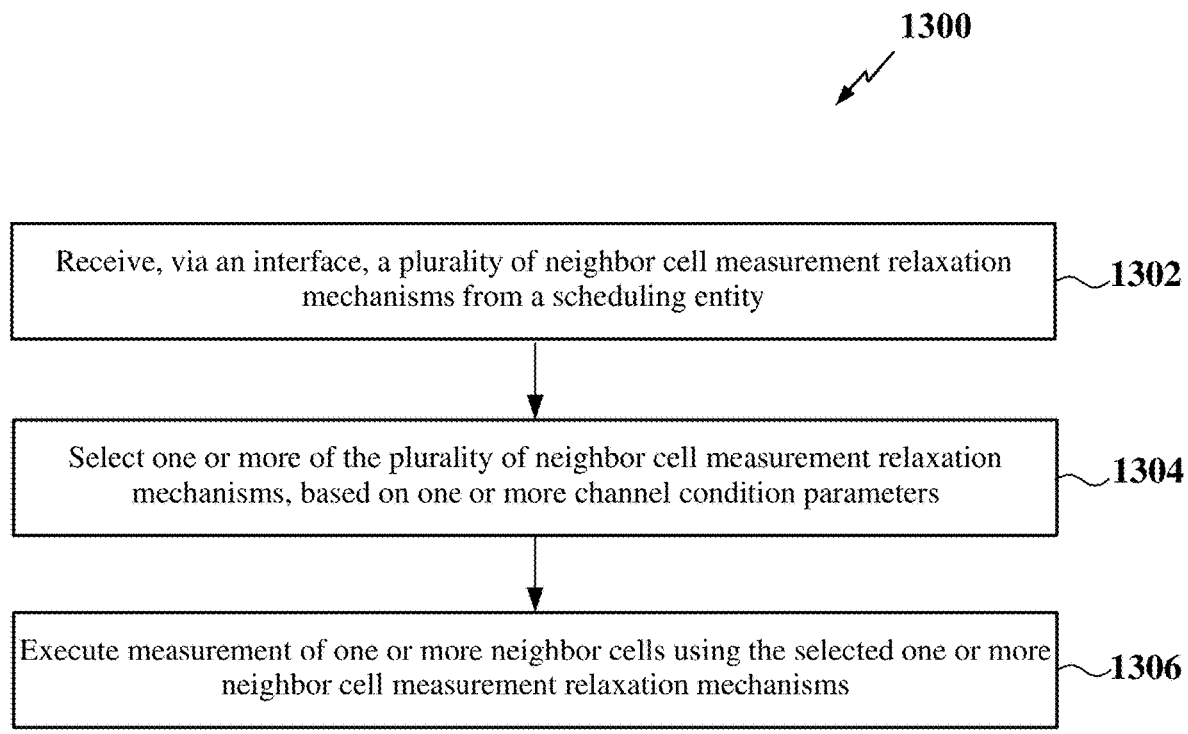
FIG. 13 is an example flowchart for determining one or more channel condition parameters, selecting one or more of a plurality of cell measurement relaxation mechanisms and measuring one or more neighbor cells using the selected relaxation mechanism.

FIG. 13 is an example flowchart 1300 for determining one or more channel condition parameters, selecting one or more of a plurality of cell measurement relaxation mechanisms and measuring one or more neighbor cells using the selected relaxation mechanism. In block 1302, a scheduled entity (such as UE), receives, via an interface (such as 914), a plurality of neighbor cell measurement relaxation mechanisms from a scheduling entity (such as 800). In block 1304, the scheduled entity selects one or more of a plurality of neighbor cell measurement relaxation mechanisms, based on one or more channel system parameters, discussed above in connection with FIGS. 10-12. In block 1306, the scheduled entity executes measurement of one or more neighbor cells using the selected one or more neighbor cell measurement relaxation mechanisms.

The processes shown in FIGS. 11, 12 and 13 may include additional aspects, such as any single aspect or any combination of aspects described below or in connection with one or more other processes described elsewhere herein.

Aspect 1: A method for an apparatus of a scheduled entity to communicate within a wireless communication network, including: receiving, via a first interface, a plurality of neighbor cell measurement relaxation mechanisms from a scheduling entity; selecting one or more of the plurality of neighbor cell measurement relaxation mechanisms, based on one or more channel condition parameters; and executing measurement of one or more neighbor cells using the selected one or more neighbor cell measurement relaxation mechanisms.

Aspect 2: The method of aspect 1, where the one or more channel condition parameters includes a reference signal received power (RSRP), that is one of above or below a configured RSRP threshold.

Aspect 3: The method of any of aspects 1 or 2, where the one or more channel condition parameters includes a reference signal received quality (RSRQ), that is one of above or below a configured RSRQ threshold.

Aspect 4: The method of any of aspects 1 through 3, where the one or more channel condition parameters includes a signal-to-noise and interference ratio (SINR) that is one of above or below a configured SINR threshold.

Aspect 5: The method of any of aspect 1 through 4, where the one or more channel condition parameters include at least one of a low-mobility or a not-at-cell-edge condition.

Aspect 6: The method of any of aspects 1 through 5, where the low mobility condition includes a channel quality that does not change more than a configured amount over a time interval.

Aspect 7: The method of any of aspects 1 through 6, where the not-at-cell-edge condition includes a channel quality that is equal to or greater than a configured amount.

Aspect 8: The method of any of aspects 1 through 7, where the one or more channel condition parameters include one or more combinations of reference signal received power (RSRP), reference signal received quality (RSRQ) and signal-to-noise and interference ratio (SINR).

Aspect 9: The method of any of aspects 1 through 8, where the one or more channel condition parameter includes one or more channel condition parameters for serving cell channel.

Aspect 10: The method of any of aspects 1 through 9, where the plurality of neighbor cell measurement relaxation mechanisms include: inter-frequency measurement of at least one neighboring cell at regular time intervals, intra-frequency measurement of at least one neighboring cell at regular time intervals, and inter-radio access technology (RAT) measurement of at least one neighboring cell at regular time intervals.

Aspect 11: The method of any of aspects 1 through 10, where the plurality of neighbor cell measurement relaxation mechanisms include: inter-frequency measurement of at least one neighboring cell at scaled time intervals, intra-frequency measurement of at least one neighboring cell at scaled time intervals, and inter-radio access technology (RAT) measurement of at least one neighboring cell at scaled time intervals.

Aspect 12: The method of any of aspects 1 through 11, where one of the plurality of neighbor cell measurement relaxation mechanisms includes not performing measurements of at least one neighboring cell for a configured period of time.

Aspect 13: The method of any of aspects 1 through 3, where the selecting of one or more of the plurality of neighbor cell measurement relaxation mechanisms includes selecting one or more of the plurality of neighbor cell measurement relaxation mechanisms only when the scheduling entity is in an idle or inactive mode.

Aspect 14: A wireless communication device in a wireless communication network including a wireless transceiver, a memory, and a processor coupled to the wireless transceiver and the memory, the processor and the memory configured to perform a method of any one of aspects 1 through 13.

Aspect 15: A wireless communication device in a wireless communication network including at least one means for performing a method of any one of aspects 1 through 13.

Aspect 16: A non-transitory computer-readable medium storing computer-executable code, including code for causing a wireless communication device to perform a method of any one of aspects 1 through 13.

Several aspects of a wireless communication network have been presented with reference to an exemplary implementation. As those skilled in the art will readily appreciate, various aspects described throughout this disclosure may be extended to other telecommunication systems, network architectures and communication standards.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus of a scheduled entity within a wireless network, comprising:
    a first interface configured to obtain a plurality of different neighbor cell measurement relaxation mechanisms from a scheduling entity in the wireless network; and
    a processing system configured to:
        select one or more of the plurality of different neighbor cell measurement relaxation mechanisms based on one or more channel condition parameters; and
        execute measurement of each of one or more neighbor cells using the selected one or more neighbor cell measurement relaxation mechanisms.

2. The apparatus of claim 1, wherein the one or more channel condition parameters comprises a reference signal received power (RSRP), that is one of above or below a configured RSRP threshold.

3. The apparatus of claim 2, wherein the one or more channel condition parameters comprises a reference signal received quality (RSRQ), that is one of above or below a configured RSRQ threshold.

4. The apparatus of claim 3, wherein the one or more channel condition parameters comprises a signal-to-noise and interference ratio (SINR) that is one of above or below a configured SINR threshold.

5. The apparatus of claim 1, wherein the one or more channel condition parameters comprise at least one of a low-mobility or a not-at-cell-edge condition.

6. The apparatus of claim 5, wherein the low mobility condition comprises a channel quality that does not change more than a configured amount over a time interval.

7. The apparatus of claim 5, wherein the not-at-cell-edge condition comprises a channel quality that is equal to or greater than a configured amount.

8. The apparatus of claim 1, where the one or more channel condition parameters comprise one or more combinations of reference signal received power (RSRP), reference signal received quality (RSRQ) and signal-to-noise and interference ratio (SINR).

9. The apparatus of claim 1, wherein the one or more channel condition parameter comprises one or more channel condition parameters for serving cell channel.

10. The apparatus of claim 1, wherein the plurality of different neighbor cell measurement relaxation mechanisms comprise:
    inter-frequency measurement of at least one neighboring cell at regular time intervals,
    intra-frequency measurement of at least one neighboring cell at regular time intervals, and
    inter-radio access technology (RAT) measurement of at least one neighboring cell at regular time intervals.

11. The apparatus of claim 1, wherein the plurality of different neighbor cell measurement relaxation mechanisms comprise:
    inter-frequency measurement of at least one neighboring cell at scaled time intervals,
    intra-frequency measurement of at least one neighboring cell at scaled time intervals, and
    inter-radio access technology (RAT) measurement of at least one neighboring cell at scaled time intervals.

12. The apparatus of claim 1, wherein one of the plurality of different neighbor cell measurement relaxation mechanisms comprises not performing measurements of at least one neighboring cell for a configured period of time.

13. The apparatus of claim 1, wherein the processing system is further configured to:
    select one or more of the plurality of different neighbor cell measurement relaxation mechanisms when the scheduling entity is in an idle or inactive mode.

14. A method for an apparatus of a scheduled entity to communicate within a wireless communication network, comprising:
    receiving, via a first interface, a plurality of different neighbor cell measurement relaxation mechanisms from a scheduling entity;
    selecting one or more of the plurality of different neighbor cell measurement relaxation mechanisms, based on one or more channel condition parameters; and
    executing measurement of each of one or more neighbor cells using the selected one or more neighbor cell measurement relaxation mechanisms.

15. The method of claim 14, wherein the one or more channel condition parameters comprises a reference signal received power (RSRP), that is one of above or below a configured RSRP threshold.

16. The method of claim 15, wherein the one or more channel condition parameters comprises a reference signal received quality (RSRQ), that is one of above or below a configured RSRQ threshold.

17. The method of claim 16, wherein the one or more channel condition parameters comprises a signal-to-noise and interference ratio (SINR) that is one of above or below a configured SINR threshold.

18. The method of claim 14, wherein the one or more channel condition parameters comprise at least one of a low-mobility or a not-at-cell-edge condition.

19. The method of claim 18, wherein the low mobility condition comprises a channel quality that does not change more than a configured amount over a time interval.

20. The method of claim 18, wherein the not-at-cell-edge condition comprises a channel quality that is equal to or greater than a configured amount.

21. The method of claim 14, where the one or more channel condition parameters comprise one or more combinations of reference signal received power (RSRP), reference signal received quality (RSRQ) and signal-to-noise and interference ratio (SINR).

22. The method of claim 14, wherein the one or more channel condition parameter comprises one or more channel condition parameters for serving cell channel.

23. The method of claim 14, wherein the plurality of different neighbor cell measurement relaxation mechanisms comprise:
    inter-frequency measurement of at least one neighboring cell at regular time intervals,
    intra-frequency measurement of at least one neighboring cell at regular time intervals, and
    inter-radio access technology (RAT) measurement of at least one neighboring cell at regular time intervals.

24. The method of claim 14, wherein the plurality of different neighbor cell measurement relaxation mechanisms comprise:
    inter-frequency measurement of at least one neighboring cell at scaled time intervals,
    intra-frequency measurement of at least one neighboring cell at scaled time intervals, and
    inter-radio access technology (RAT) measurement of at least one neighboring cell at scaled time intervals.

25. The method of claim 14, wherein one of the plurality of different neighbor cell measurement mechanisms comprises not performing measurements of at least one neighboring cell for a configured period of time.

26. The method of claim 14, wherein the selecting of one or more of the plurality of different neighbor cell measurement relaxation mechanisms comprises selecting one or more of the plurality of neighbor cell measurement relaxation mechanisms only when the scheduling entity is in an idle or inactive mode.

27. An apparatus of a scheduled entity within a wireless network, comprising:
    means for obtaining a plurality of different neighbor cell measurement relaxation mechanisms from a scheduling entity in the wireless network; and
    means for processing, configured to:
        select one or more of the plurality of different neighbor cell measurement relaxation mechanisms based on one or more channel condition parameters; and
        execute measurement of each of one or more neighbor cells using the selected one or more neighbor cell measurement relaxation mechanisms.

28. The apparatus of claim 27, wherein the plurality of different neighbor cell measurement relaxation mechanisms comprise:
    inter-frequency measurement of at least one neighboring cell at regular time intervals,
    intra-frequency measurement of at least one neighboring cell at regular time intervals, and
    inter-radio access technology (RAT) measurement of at least one neighboring cell at regular time intervals.

29. The apparatus of claim 27, wherein the plurality of different neighbor cell measurement relaxation mechanisms comprise:
    inter-frequency measurement of at least one neighboring cell at scaled time intervals,
    intra-frequency measurement of at least one neighboring cell at scaled time intervals, and
    inter-radio access technology (RAT) measurement of at least one neighboring cell at scaled time intervals.

30. A non-transitory computer-readable medium including program instructions configured to cause a processor system of a scheduled entity to communicate within a wireless network, the storage medium comprising:
    instructions for receiving, via a first interface, a plurality of different neighbor cell measurement relaxation mechanisms from a scheduling entity;
    instructions for selecting one or more of the plurality of different neighbor cell measurement relaxation mechanisms, based on one or more channel condition parameters; and
    instructions for executing measurement of each of one or more neighbor cells using the selected one or more neighbor cell measurement relaxation mechanisms.

* * * * *